United States Patent
Patapoutian et al.

(10) Patent No.: US 6,882,604 B2
(45) Date of Patent: *Apr. 19, 2005

(54) METHOD AND APPARATUS FOR UTILIZING MODULATION CODES THAT PRODUCE MAXIMIZED SAMPLE TIMING INFORMATION

(75) Inventors: Ara Patapoutian, Westborough, MA (US); Peter McEwen, Santa Clara, CA (US)

(73) Assignee: Maxtor Corporation, Longmont, CO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 759 days.

(21) Appl. No.: 09/953,845

(22) Filed: Sep. 17, 2001

(65) Prior Publication Data

US 2003/0053234 A1 Mar. 20, 2003

(51) Int. Cl.$^7$ .............................. G11B 7/00; H04J 13/02
(52) U.S. Cl. ............................. 369/44.34; 360/78.06; 370/209; 375/309
(58) Field of Search ..................... 369/44.34, 30.17, 369/13.02, 13.17, 44.29, 44.28, 13.22, 44.11; 360/78.06, 65, 46; 375/290, 341, 350, 138, 150, 142, 219, 270, 309, 301; 370/209, 335, 320, 342, 441, 479, 309; 380/34

(56) References Cited

U.S. PATENT DOCUMENTS

| | | | | |
|---|---|---|---|---|
| 5,535,239 A | * | 7/1996 | Padovani et al. | 370/209 |
| 5,600,672 A | * | 2/1997 | Oshima et al. | 375/219 |
| 5,602,833 A | * | 2/1997 | Zehavi | 370/209 |
| 5,757,294 A | | 5/1998 | Fisher et al. | |
| 6,108,317 A | * | 8/2000 | Jones et al. | 370/320 |
| 6,249,398 B1 | | 6/2001 | Fisher et al. | |

* cited by examiner

*Primary Examiner*—Ali Neyzari
(74) *Attorney, Agent, or Firm*—Cesari and McKenna, LLP

(57) ABSTRACT

The invention is a modulation system that encodes symbols in accordance with a modulation code which, for a given communications channel, produces a signal that at the decoder includes maximized sample timing information in each encoded symbol. For systems that use PLLs to control a sample timing clock, the sample timing information is the average or squared slope. The modulation code used for a given system is selected based on the target response h(x) of the associated communications channel, such that $h(x)*r_k$ exceeds a predetermined threshold value, where "*" represents convolution and $r_k$ is a modulation code symbol. To reduce the bit overhead, or code rate, the inventive modulation system provides more modulation code symbols at the start of a data block, or sector, when system jitter is expected to be relatively high in response, for example, to the movement of a read head. The system then includes fewer modulation code symbols later in the block, when the system jitter associated with a read or receive operation is reduced. The system thus provides sufficient timing information to minimize PLL jitter.

20 Claims, 4 Drawing Sheets

METHOD AND APPARATUS FOR UTILIZING MODULATION CODES THAT PRODUCE MAXIMIZED SAMPLE TIMING INFORMATION

BACKGROUND OF THE INVENTION

1. Field of the Invention

The invention relates generally to data processing systems and, more particularly, to modulation encoding subsystems.

2. Background Information

Data represented by multiple-bit symbols may be transmitted over a communications channel in the form of an analog signal, with ones represented by signal amplitudes above a predetermined first value and zeros represented by signal amplitudes below a predetermined second value. The bit transitions from ones to zeros and zeros to ones are thus represented by signal fluctuations. As appropriate, the communications channel may include magnetic media on which the data are recorded as a series of magnetic flux transitions, with a given direction representing a one and an opposite direction representing a zero. A bit transition is thus recorded as a change in flux direction, and the system recovers the recorded information by reading the flux transitions to recreate the analog signal. A decoding subsystem converts the recovered or received analog signal to a digital signal and recovers the digital information contained therein by first sampling the analog signal and, using an analog-to-digital (A/D) converter in a conventional manner, representing the signal samples as digital values. The system then detects the bits, that is, assigns bit values, i.e., ones and zeros, to the sampled signal based on the digital values. To provide accurate samples for bit detection, the system must sample the analog signal at times that correspond to the respective bits.

As is well known in the art, the A/D converter takes signal samples at times dictated by the pulses produced by a timing circuit. The timing circuit typically includes a phase locked-loop (PLL), which controls a clock that produces the sample timing pulses. If the PLL synchronizes the clock to the information contained in the analog signal, the clock pulses occur at one or more predetermined times during the signal segments that correspond to the respective bits.

The PLL controls the signal sample clock based on the timing of the bit transitions in the analog signal. In the absence of bit transitions, the PLL does not update the clock. Thus, sample timing errors, which adversely affect bit detection, may persist over segments of the data in which no transitions occur.

To minimize the sample timing errors, prior systems generally encode multi-bit symbols using a modulation code that limits the number of bits between signal transitions, that is, a code that limits the "run length" of consecutive 1's or 0's. The modulation code thus ensures that a signal transition corresponding to a transition from one to zero or zero to one occurs at least every "k+1" encoded bits. These codes, which are commonly referred to as k constraint codes, necessarily add bits to the data stream. A system designer selects a modulation code based on a desired run length and the associated bit overhead.

A modulation encoder using the k constraint code encodes the symbols in groups, to ensure that the run length constraints are met over the entire datastream. Otherwise, the run length may be violated by, for example, a symbol that includes multiple zeros as the least significant bits followed by a symbol that includes multiple zeros as the most significant bits. The modulation encoding schemes are thus relatively complex.

To reproduce the data, a demodulation decoder removes the k constraint code by similarly decoding the datastream as groups of symbols, after the analog signal has been converted to a digital signal and the bits detected. If a bit detection error occurs, such as assigning the wrong values to one or more bits in a group, the decoder may improperly decode multiple symbols of the group. The bit detection error thus propagates over the group.

Error correction codes (ECCs) are commonly used to encode the data symbols in such a manner that decoding errors can possibly be corrected. The ECCs are designed to correct a maximum number of symbols per data code word by including in the data code word a number of ECC symbols that are typically twice the number of correctable errors. When selecting an ECC code, the system designer must thus trade off the number of correctable errors versus ECC symbol overhead.

Increases in bit density tend to adversely affect bit detection in signals recovered from magnetic storage media. When bit transitions are recorded in adjacent cells and/or in smaller cells, the associated flux transitions tend to interfere with one another. The interference results in shifts in the size and locations of the bit transitions in the recovered analog signal, or what is commonly referred to as "intersymbol interference." To minimize the adverse affects of such interference in the detecting of the bits, certain prior demodulation systems have used targeted-response finite impulse response filter (FIRS), also known as partial response or PRML, essentially to compensate for the effects of the interference. One such system is discussed in U.S. Pat. No. 6,249,398, which is assigned to a common assignee and incorporated herein by reference. The decoding system thus determines sample times and assigns bit values based on a filtered version of the received encoded analog signal.

The filtering works well as an aid to bit detection, however, the filtering does not necessarily aid the decoder in determining the times for sampling the analog signal.

SUMMARY OF THE INVENTION

The invention is a modulation system that encodes symbols in accordance with a modulation code which, for a given communications channel, produces a signal that at the decoder includes maximized sample timing information in each encoded symbol. For systems that use PLLs to control a sample timing clock, the sample timing information is proportional to the average squared slope, as discussed in more detail below. The system encodes the symbols without imposing a k constraint, and thus, the symbols may be encoded one-by-one, and error propagation between symbols is essentially eliminated.

The modulation code used for a given system is selected based on the target response of the associated communications channel. This is in contrast to k constraint codes that are selected based on run length constraint only. To reduce the bit overhead, or code rate, the inventive modulation system provides more modulation code symbols at the start of a data block, or sector, when system jitter is expected to be relatively high because of initial phase and frequency uncertainties associated with, for example, the operations of the associated spindle and clock. The system then includes fewer modulation code symbols later in the block, when the system jitter has settled out. The system thus reduces the effective code rate without adversely affecting the performance of the PLL.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
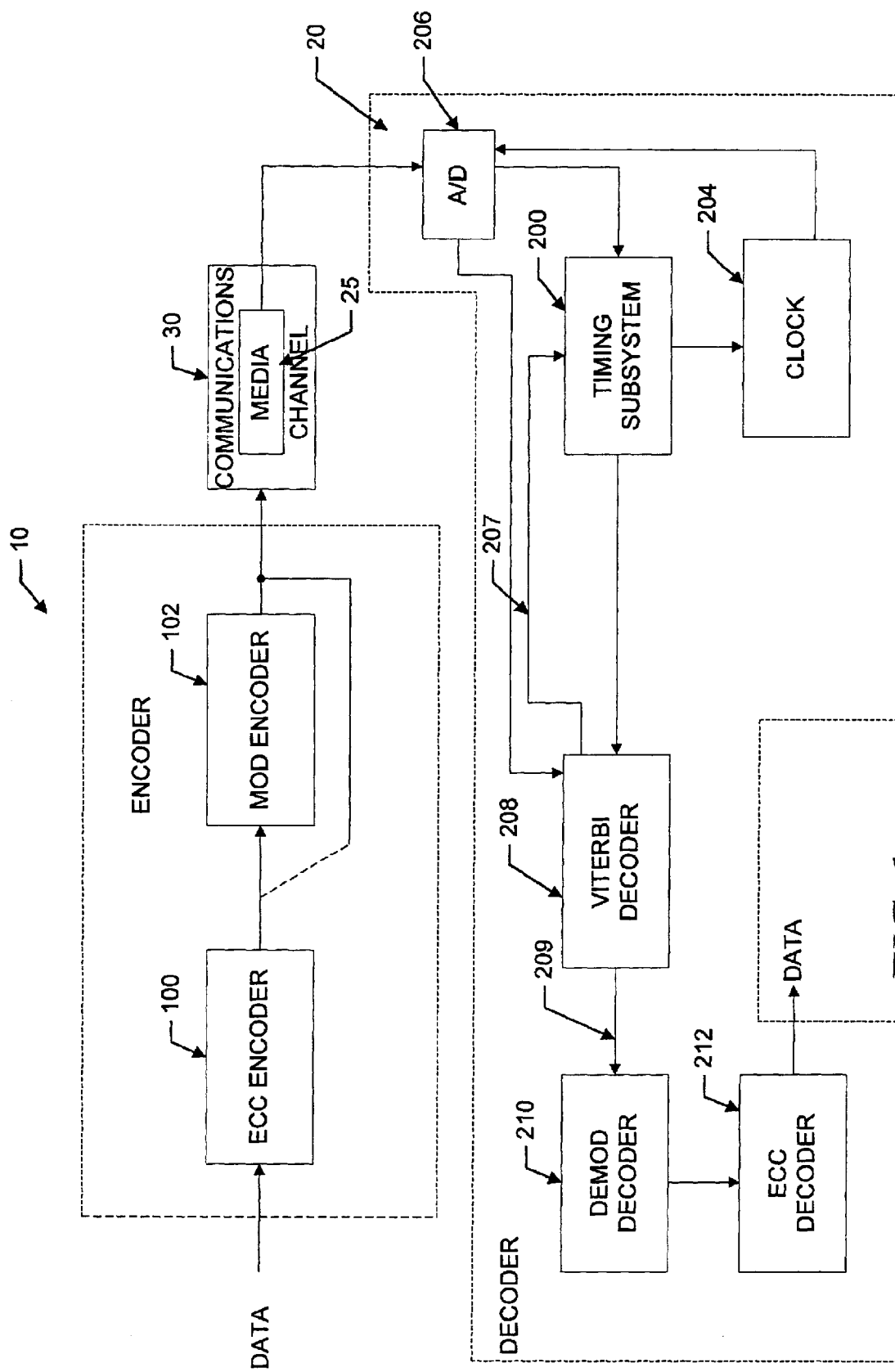
FIG. 1 is a functional block diagram of a system constructed in accordance with the invention.

Referring to FIG. 1, an encoding system 10 encodes digital data and transmits the encoded data to a decoding system 20 over a communications channel 30. The data is transmitted over the channel in the form of an analog data signal, which includes signal transitions that correspond to bit transitions in the underlying data. The communications channel may include magnetic storage media 25 that retains the data as a corresponding series of magnetic flux reversals. If magnetic media is in use, the system retrieves the data by sensing the flux reversals and recovering the analog signal, which is then provided to the decoding system 20.

As a first step in decoding the data, the decoding system 20 converts the analog signal to a digital signal in an analog-to-digital (A/D) converter 206. The digital signal is then provided to both a Viterbi decoder 208 for bit detection and to a timing subsystem 200 for use in controlling the phase of a sample timing clock 204 that, in turn, controls the times at which the A/D converter samples the analog signal. The operations of the decoding system and, in particular, the timing subsystem, are discussed in more detail below.

As the analog data signal proceeds through the communications channel to the decoding system, the signal is modified based on the characteristics of the communications channel. If the channel characteristics are represented as a mathematical function h(x), the signal that is received at the timing subsystemcorresponds to the digital data convolved with h(x). The signal may also include noise and contributions from the jitter associated with phase and frequency uncertainties and the corresponding sample timing errors. As discussed below, the encoding system encodes the data to provide to the timing block 200 maximized timing information that the timing block then uses to drive the sample timing clock into synchronism with the data. This minimizes the sample timing errors, and thus, the associated contributions to the digital signal produced by the A/D converter. For a more detailed discussion of target functions refer to U.S. Pat. No. 6,249,398 that is incorporated herein by reference.

The encoding system 10 includes an error correction code (ECC) encoder 100 that encodes multi-bit data symbols to produce ECC symbols. A modulation encoder 102 encodes the ECC symbols in accordance with a modulation code that is selected to provide, for a given code rate, maximum timing information to the timing block 200 in the decoding system 20. The modulation code is thus selected based on the associated channel-characteristic, or target, function h(x). The modulation code and the selection thereof are discussed in more detail below.

The timing subsystem 200 controls the sample timing clock 204, which, in turn, controls when the A/D converter 206 samples the received analog signal that is provided over the communications channel 30. As discussed in more detail below, the timing subsystem uses the timing information included in the received data signal to synchronize the sample timing clock with the transmitted data. The A/D converter then takes samples of the received analog signal at one or more predetermined times in signal segments that correspond to the respective bits.

In response to the sample timing clock signals, the A/D converter 206 takes the samples of the received data signal and operates in a conventional manner to produce corresponding digital values. A Viterbi decoder 208 operates in a known manner to assign bit values to the digital values, and a demodulation decoder 210 removes the modulation code, to reproduce the data and ECC symbols. As appropriate, an error correction decoder 212 thereafter detects and/or corrects any errors in the symbols, to reproduce the data.

Figure 2:
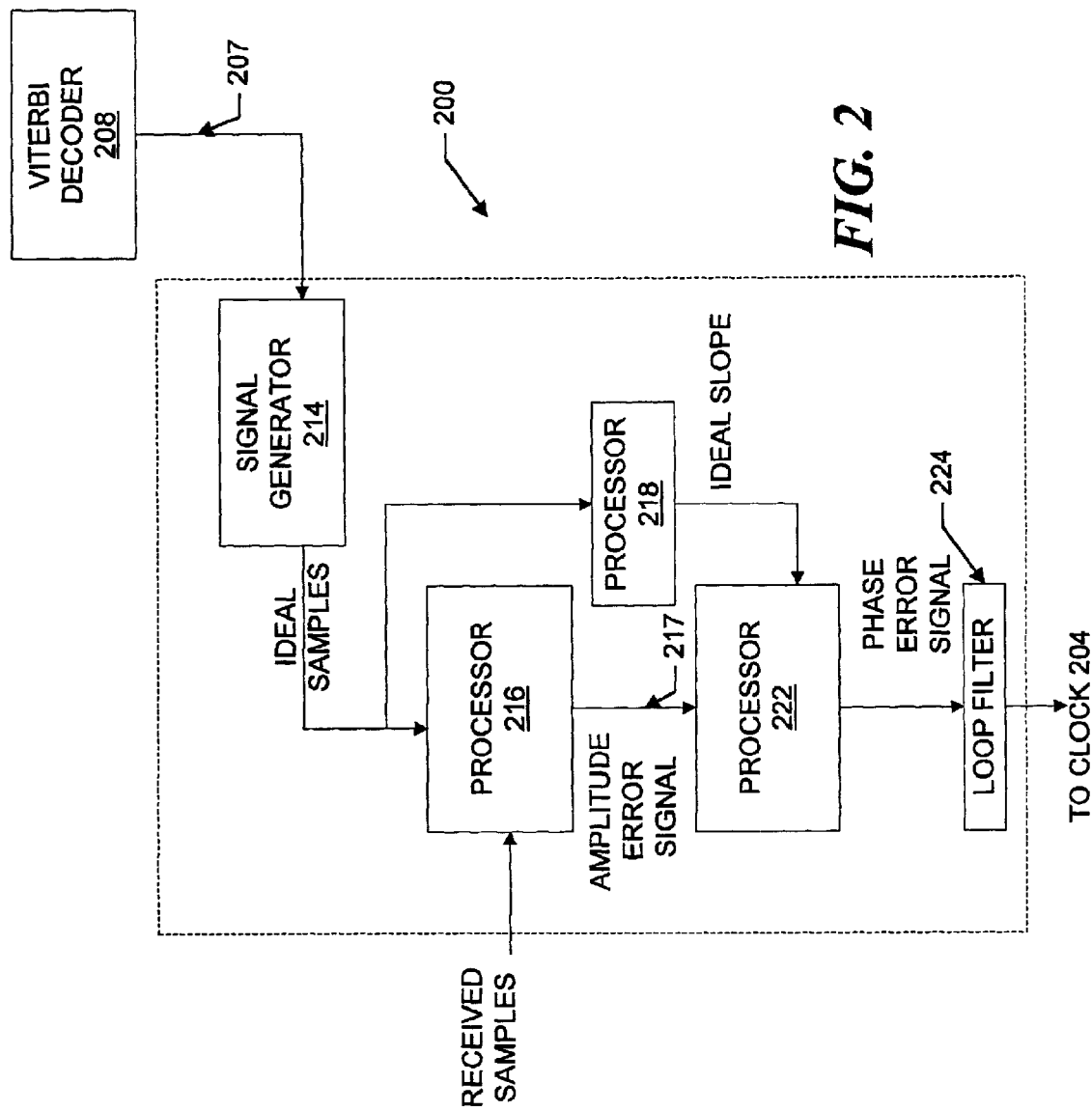
FIG. 2 is a functional block diagram of a timing subsystem included in the system of FIG. 1.
Figure 3:
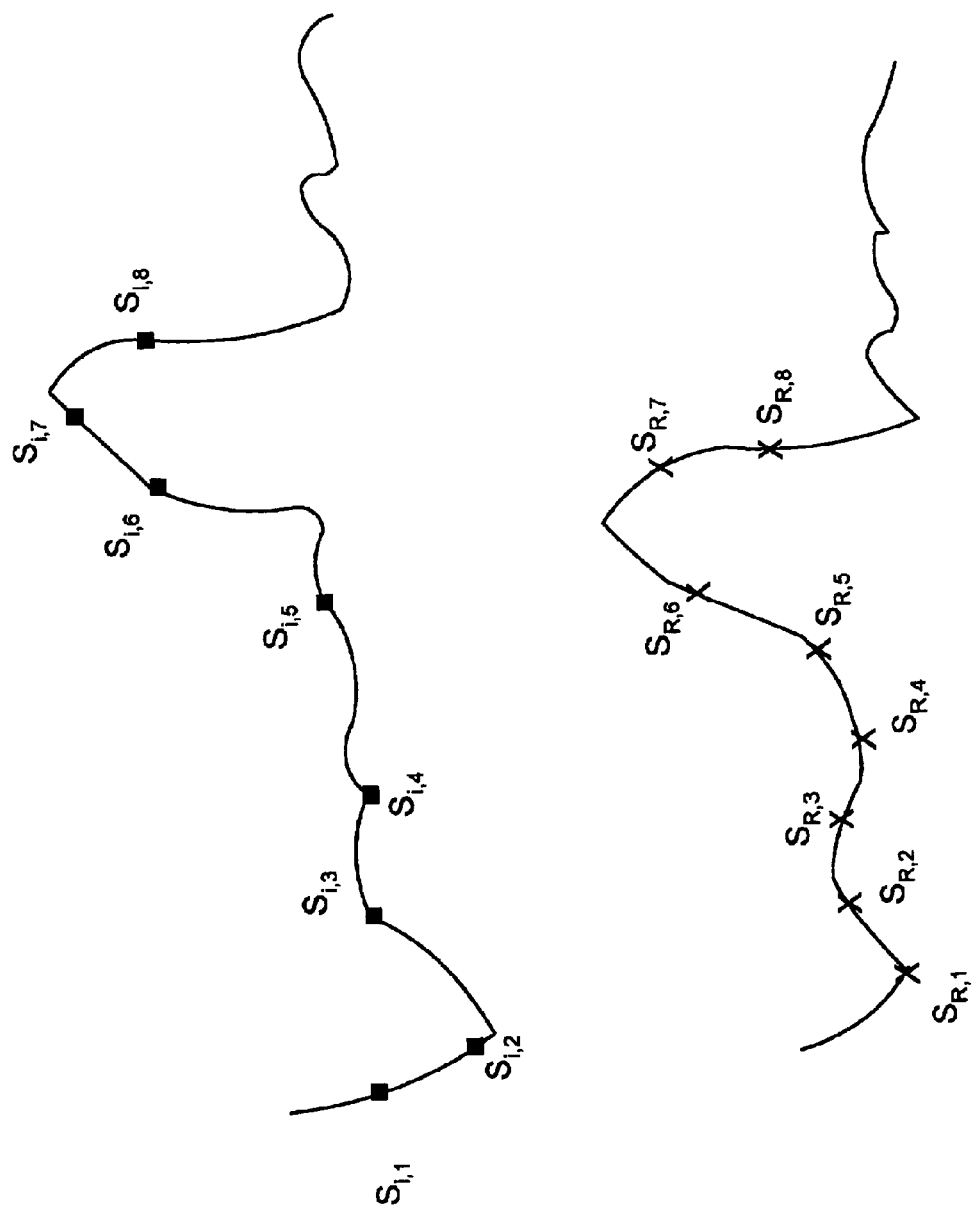
FIG. 3 illustrates a waveform produced by a signal generator of FIG. 2.

As depicted in FIG. 2, the timing block 200 receives preliminary bit values from the Viterbi decoder 208 on line 207. The preliminary bit values are based on a shorter is string of digital values than are the bit values that are supplied to demodulation and ECC decoders 210, 212 on line 209. The preliminary bit values represent a trade-off of time versus accuracy, with the preliminary bit values being accurate enough for use in the timing block, to drive the sample timing clock into synchronism with the bit transitions in the received analog signal. The timing block includes a signal generator 214 that produces an "ideal" (noiseless) received waveform that corresponds, at the sampled signal segments, to the preliminary bit values. The ideal waveform, which corresponds to the bit values convolved with the channel characteristic function h(x), has an amplitude that is the expected value of the received signal at the times that correspond to the predetermined, or optimal, sample times. Referring now also to FIG. 3, the signal generator associates the string of bit values with a waveform that has the expected values $S_{ij}$ at the predetermined sample times.

The timing block 200 further includes a processor 216 that compares the amplitude of the generated waveform, i.e., the expected signal sample values, with the amplitude of the corresponding segment of the received signal, i.e., the actual sample values. If the received signal is sampled at the appropriate times, the two signal amplitudes will be relatively close—differing essentially by the noise included in the received signal—and the processor produces a relatively small amplitude error signal on line 217. If, however, the received signal is sampled at times other than the predetermined times, the samples have different values, for example, the values denoted by $S_{rj}$ in FIG. 3. The comparison then results in a relatively large amplitude error signal that represents both the differences in the sample times and the included noise.

A processor 218 differentiates the ideal waveform to produce a signal that represents the slope of the waveform. A processor 222 then multiplies the slope with the amplitude error signal, to produce a phase error signal. For speed and simplicity, the processor may instead use the sign of the slope in the multiplication operation. A loop filter 224 smoothes the phase error signal, to reduce the effects of noise included in the phase error estimate. The loop filter is preferably of the type described in U.S. Pat. No. 6,236,343 which is assigned to a common assignee and incorporated herein by reference.

The phase error signal is used to adjust the sample timing clock 204, to drive the clock to produce sample timing pulses that correspond to the predetermined optimum sample times in the received analog signal. As discussed above, the modulation code selected for use with the system produces encoded symbols that, after being sent over the communications channel, include maximized slope information. Accordingly, the timing subsystem produces a phase error signal that reliably adjusts the sample timing clock in accordance with the differences between the actual and the optimal sample times. The adjustments should relatively quickly bring the clock into synchronism with the data in the received signal, and jitter in the timing block, and thus, in the phase locked loop of which the timing block is a part, is minimized.

The modulation code used by the modulation encoder 102 is selected to produce symbols that after passing through the communications channel 30 have maximized average squared slope for a given code rate. If the communications channel characteristics that affect the data signal are represented by the target function h(x), the modulation code symbols are selected such that $(h'(x)*r_k)^2$ has an average value that is greater than a predetermined threshold value, where $r_k$ is a modulation code symbol and "*" represents convolution.

In the system of FIG. 1, the data are encoded in the ECC encoder 100 in accordance with an ECC that produces 10-bit symbols. The data and ECC symbols are then encoded as 10-bit symbols by the modulation encoder 102, to produce 11-bit modulation code symbols that when convolved with h(x) include maximized slope information. The modulation code symbols, $r_k$, are thus the $2^{10}$ symbols of the possible $2^{11}$ bit symbols for which $(h'(x)*r_k)^2$ has the greatest average values. The modulation encoder is preferably a look-up table that is entered using the 10-bit symbols. Alternatively, the modulation encoder may use hardware, software or firmware to manipulate the 10-bit symbols to produce the 11-bit symbols. In general, if at-bit symbol based ECC is used by the encoding system, the modulation code encodes the data and ECC symbols as t-bit symbols and produces (t+m)-bit symbols that include maximized bit timing information. Thus, the modulation code associates the t-bit symbols with the $2^t$ symbols of the possible $2^{m+t}$ code symbols that at the decoder have the greatest average squared slope or, in other words, that at the decoder have relatively sharp bit transitions.

The modulation encoder encodes the 10-bit symbols one at a time, and includes in each modulation code symbol an additional bit. To reduce the code rate, that is, the ratio of recorded bits to data bits, the system selectively encodes the 10-bit symbols based on a their positions in the data block. The selection of which symbols to encode is based on a profile of jitter uncertainties at different positions, or symbol locations, of a block.

Figure 4:
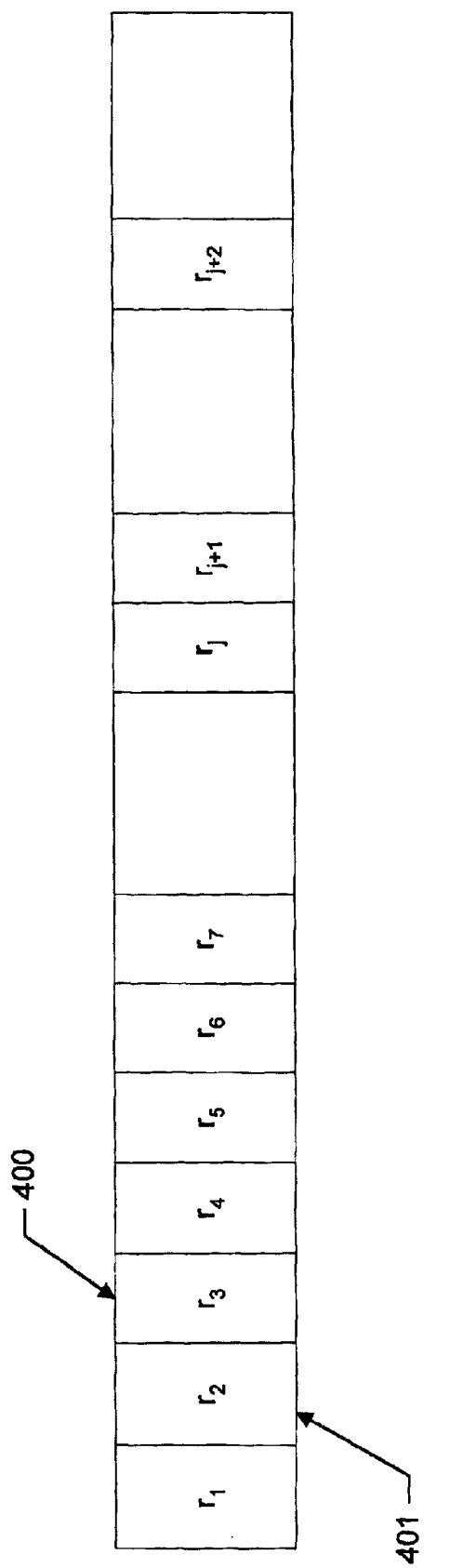
FIG. 4 illustrates a block that includes modulation code symbols.

Specifically, a read operation typically involves the movement of a read head to the start of the data block. The moving of the head introduces mechanical jitter into the system, and thus, associated contributions into the digital signal produced by the A/D converter based on the recovered analog signal. As the read operation continues, the initial jitter uncertainties settle out, and the contributions associated with the jitter and the corresponding sample timing errors that are introduced into the recovered signal are correspondingly reduced. Based on this profile of the read operation, the system includes more of the 11-bit encoded symbols at the start 401 of the block 400 and progressively fewer at positions further along the block, as illustrated in FIG. 4. This provides the timing subsystem with sufficient timing information to adjust the clock appropriately to the bit transitions rather than the included noise.

Alternatively, the system may encode "b" m-bit symbols, or bm bits, to produce a (bm+1)-bit modulation code symbol that provides maximized timing information at the decoder. In this embodiment, the system decodes the bm bits in the same manner discussed above, as if the bm bits are a single symbol.

The system is readily implemented by means of one or more digital processors, either general purpose or special purpose. Conventional signal processing software and algorithms are readily applied to perform the requisite processing described herein.

What is claimed is:

1. A system for encoding data, the system including:
   A. a communications channel that modifies multiple-bit symbols; and
   B. a modulation code encoder that encodes the data to produce multiple-bit modulation code symbols $r_k$ that are provided to the communications channel, the encoder encoding the data in accordance with a modulation code that for a given code rate produces symbols that, after modification by the communications channel, include maximized bit timing information.

2. The system of claim 1 wherein the modulation code encoder produces the modulation code symbols that after manipulation by the communications channel are associated with average squared slopes that exceed the average squared slopes of other symbols of the same length.

3. The system of claim 1 wherein
   a. the target function is h(x); and
   b. the modulation encoder produces the modulation code symbols $r_k$ for which an average squared value of $r_k$ convolved with a first derivative of h(x) exceeds a predetermined threshold value.

4. The system of claim 2 wherein
   a. the communications channel includes a magnetic medium for retaining the multiple-bit symbols in multiple-symbol blocks; and
   b. the modulation encoder produces the modulation code symbols that are to be recorded in predetermined locations within the blocks, the locations being selected based on a profile of system jitter associated with receiving or retrieval operations, with more locations selected for portions of the block that are associated with relatively large system jitter and fewer locations selected for portions of the block associated with less system jitter.

5. The system of claim 1 further including
   B. an error correction encoder that encodes data bits to produce m bit error correction code symbols; and
   C. the modulation encoder encodes selected m-bit data and error correction code symbols to produce m+1 bit modulation code symbols, the encoder associating a given m-bit symbol with one of the $2^m$ ($2^{m+1}$)-bit symbols that after manipulation in accordance with a target function associated with the communications channel has an average squared slope above a predetermined threshold value.

6. The system of claim 5 wherein the modulation encoder encodes all of the data and error correction code symbols.

7. The system of claim 5 wherein the modulation encoder encodes the data and error correction code symbols that correspond to selected locations within a block for recording.

8. The system of claim 7 wherein the predetermined locations are selected based on a profile of system jitter associated with receiving or retrieval operations, with more locations selected for portions of the block associated with relatively large system jitter and fewer locations selected for portions of the block associated with less system jitter.

9. A system for producing bit timing information, the system including:
  A. a communications channel with a target response;
  B. a modulation encoder for encoding multiple-bit symbols in accordance with a modulation code that produces modulation code symbols $r_k$ that after modification by passing through the communications channel are associated with maximized timing information;
  C. a decoder for taking samples of the modulation code symbols after the symbols have passed through the communications channel, the decoder
    i. comparing the amplitudes of the samples with amplitudes of corresponding generated waveforms and producing an amplitude error signal,
    ii. multiplying the amplitude error signal by the slopes of the corresponding generated waveforms and producing a phase error signal, and
    iii. using the phase error signal to drive into synchronism with the bits of the modulation code symbols a clock that controls the taking of the samples.

10. The system of claim 9 wherein the decoder estimates the bit values of signal samples and generates the waveforms based on the estimates.

11. A method of recording symbols in blocks of a magnetic storage medium, the method including:
  A. determining a profile of system jitter associated with reading a recorded block;
  B. determining locations in the block for modulation code symbols by selecting a relatively closely spaced locations for the modulation code symbols in portions of the block that in the profile are associated with relatively large system jitter and selecting locations for the modulation code symbols that are more spaced apart in portions of the block that in the profile are associated with relatively small system jitter.
  C. encoding symbols associated with the selected locations in accordance with a modulation code to produce corresponding modulation code symbols; and
  D. recording the modulation code symbols in the associated selected locations.

12. The method of claim 11 wherein the encoding step includes encoding in accordance with a modulation code that produces symbols that, after being read from storage, include maximized bit timing information.

13. The method of claim 12 wherein the encoding step produces modulation code symbols that, after being read from storage, have average squared slopes above a selected threshold value.

14. The method of claim 12 further including the steps of
  E. reading the block;
  F. sampling the modulation code symbols;
  G. assigning estimated bit values to the samples;
  H. generating waveforms that correspond to the estimated bit values;
  I. comparing amplitudes of the samples and the corresponding waveforms to produce an amplitude error signal;
  J. multiplying the amplitude error signal by the slope of the corresponding waveform to produce a phase error signal; and
  K. using the phase error signal to drive a clock that controls the timing of the taking of the sample into synchronism with the bits of the modulation code symbols.

15. A modulation code for encoding m-bits to produce (m+t)-bit code symbols, the code for use with a system that includes a communications channel that modifies code symbols, the code being generated by selecting from a possible $2^{m+t}$ symbols the $2^m$ symbols that when modified by the channel result in symbols with maximized bit timing information.

16. The modulation code of claim 15 wherein the maximized timing information is average squared slope of the code symbols as modified by the channel.

17. The encoding system of claim 15 wherein
  a. the channel modifies symbols in accordance with a target function; and
  b. the modulation code includes code symbols that when modified by convolving with the target function have average squared slopes that are greater than the averaged squared slopes associated with the symbols that are not part of the code.

18. An encoding system including:
  A. a communications channel that modifies (m+t)-bit code symbols; and
  B. an encoder that encodes m bits to produce the (m+t)-bit code symbols that are provided to the communications channel, the encoder encoding the m bits in accordance with a code that has as symbols the $2^m$ symbols of the possible $2^{m+t}$ symbols that when modified by the channel have more bit timing information than the symbols that are not part of the code.

19. A modulation code for encoding m-bits to produce (m+t)-bit code symbols, the code for use with a system that includes a communications channel that modifies code symbols in accordance with a target function, the code being generated by selecting from a possible $2^{m+t}$ symbols the $2^m$ symbols that when convolved with the target function result in symbols with maximized bit timing information.

20. A modulation code for encoding m-bits to produce (m+t)-bit code symbols, the code for use with a system that includes a communications channel that modifies code symbols in accordance with a target function, the code being generated by selecting from a possible $2^{m+t}$ symbols the $2^m$ symbols that when convolved with the target function result in symbols with sharper bit transitions than the (m+t)-bit symbols that are not selected.

* * * * *